United States Patent
Solanille et al.

(10) Patent No.: US 6,817,574 B2
(45) Date of Patent: Nov. 16, 2004

(54) STRUCTURAL ELEMENT FOR AN AIRCRAFT, ESPECIALLY AN AIRCRAFT DOOR

(75) Inventors: Pierre Solanille, Prechacq-Josbaig (FR); Heinrich Fuchs, Meschede (DE); Gérad Lagrene, Lescar (FR); Hans-Jürgen Spychala, Meschede (DE); Richard Christophe, Jurancon (FR); Norbert Zeumer, Meschede (DE)

(73) Assignee: Honsel GmbH & Co. KG (DE)

( * ) Notice: Subject to any disclaimer, the term of this patent is extended or adjusted under 35 U.S.C. 154(b) by 0 days.

(21) Appl. No.: 10/343,331
(22) PCT Filed: Jul. 21, 2001
(86) PCT No.: PCT/EP01/08445
§ 371 (c)(1), (2), (4) Date: Jun. 2, 2003
(87) PCT Pub. No.: WO02/10013
PCT Pub. Date: Feb. 7, 2002

(65) Prior Publication Data
US 2004/0021038 A1 Feb. 5, 2004

(30) Foreign Application Priority Data
Jul. 28, 2000 (DE) .......................................... 100 37 307

(51) Int. Cl.⁷ ................................................. B64C 1/14
(52) U.S. Cl. ................................. 244/117 R; 244/129.5
(58) Field of Search ............................ 244/117 R, 119, 244/129.4, 129.5

(56) References Cited

U.S. PATENT DOCUMENTS

| 2,477,503 A | 7/1949 | Vargo |
| 2,760,814 A | 8/1956 | Watter .......................... 296/44 |
| 5,221,377 A | 6/1993 | Hunt, Jr. et al. |
| 5,379,971 A | 1/1995 | Kim et al. .................. 244/129 |
| 5,529,645 A | 6/1996 | Oswalt |
| 6,619,372 B2 | 9/2003 | Bold et al. |

FOREIGN PATENT DOCUMENTS

| DE | 4237584 | 5/1994 | ........................ 5/4 |
| DE | 19732514 | 10/1998 | ..................... 1/14 |
| EP | 1108646 | 6/2001 | |
| WO | 01/04001 | 1/2001 | |
| WO | 01/23633 | 4/2001 | |

OTHER PUBLICATIONS

International Search Report

*Primary Examiner*—Galen Barefoot
(74) *Attorney, Agent, or Firm*—Ostrolenk, Faber, Gerb & Soffen, LLP

(57) ABSTRACT

Structural element for an aircraft, especially an aircraft door, in a single-piece, integral cast embodiment consisting of an aluminum or magnesium alloy.

17 Claims, 3 Drawing Sheets

STRUCTURAL ELEMENT FOR AN AIRCRAFT, ESPECIALLY AN AIRCRAFT DOOR

Figure 1:
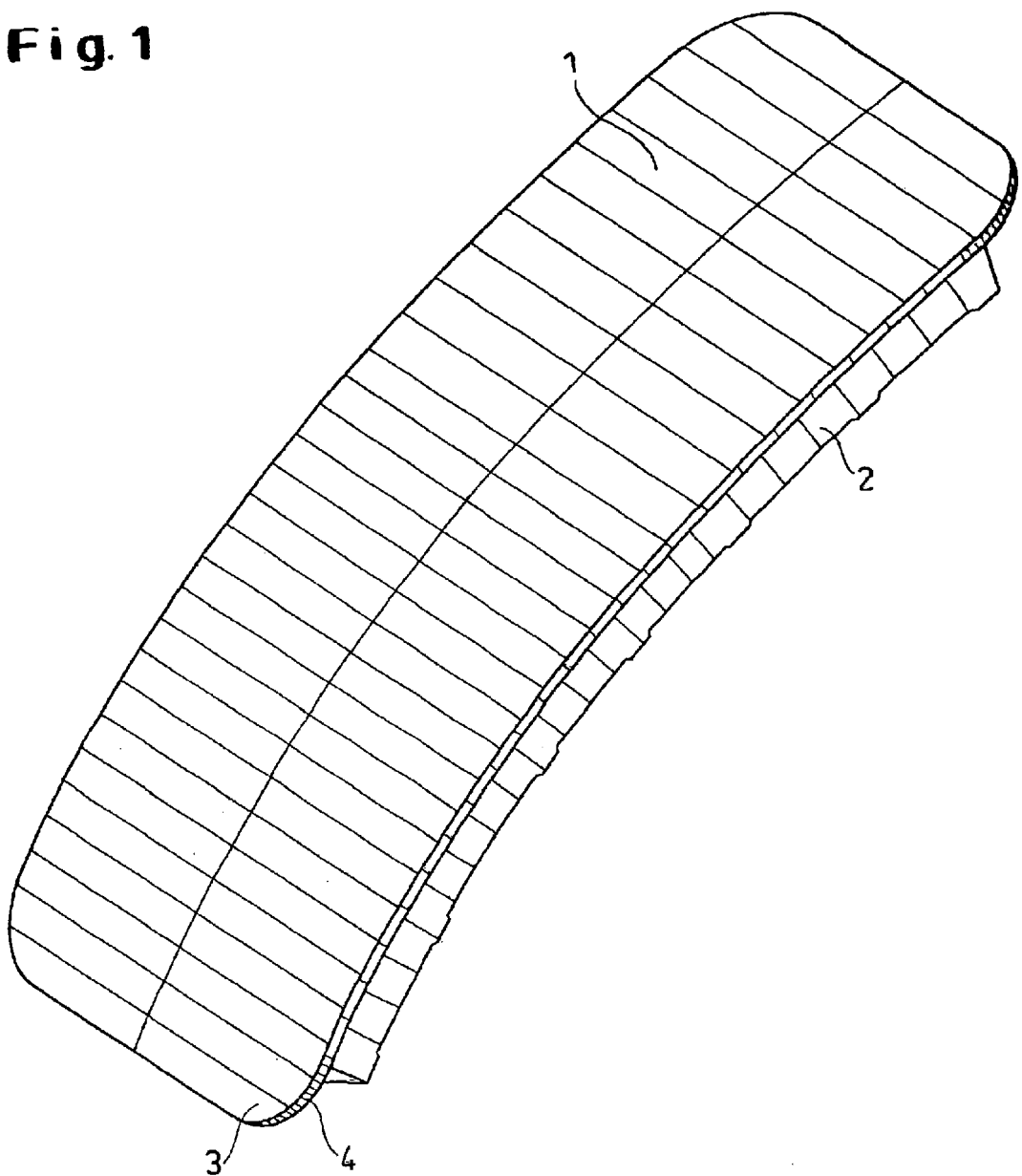

Structural elements for aircraft, especially aircraft doors, conventionally comprise a smooth outer skin, which is provided on the inner side with profiles, ribs and the like riveted or adhesively bonded to it, in order to achieve great stiffness and strength along with low weight.

The production of structural elements of this type is complex, since the stiffening profiles and ribs are often produced from solid material with a degree of machining of over 95%, and the riveting with closely set rivets also requires considerable labor.

The machining of the profiles and ribs from solid material is necessary in order for the final strength of the aluminum or magnesium alloy used not to be impaired by the effect of heat. For the same reason, the connecting of the individual elements takes place by riveting or adhesive bonding and not by welding.

Although this conventional method of production allows structural elements of minimized weight and with adequate strength to be produced, there is no assurance that stress or fatigue cracks will not form in the region of highly loaded riveted connections or regions with high notch stresses.

The invention is based on the problem of providing structural elements for aircraft, especially aircraft doors, which can be produced with low weight and high strength at low cost and, on account of a reduced risk of crack propagation, are easy to repair and service.

Taking this problem as a starting point, a structural element for an aircraft, especially an aircraft door, is proposed, produced according to the invention in a single-piece, integral cast embodiment of an aluminum or magnesium alloy.

Modern low-pressure sand casting processes in particular allow the production of large single-piece, integral cast parts with uniform, thin wall thicknesses which do not require any, or considerably less, machining than the conventional structures assembled from individual elements. To improve the material properties, zircon sand may be used for the molds and cores, if appropriate in conjunction with semi-permanent molds.

The structural element may preferably comprise hollow, arched-bridge-like transverse members, longitudinal ribs connecting the feet of the arches of the transverse members and sloping side faces connecting and closing the end faces of the transverse members, and have receptacles with gripping surfaces for straightening and machining. In addition, the structural element, especially in the embodiment as an aircraft door, may be provided with a peripheral flange, stiffened by a peripheral rib.

The structural element may in this case preferably be provided with a smooth outer skin which is cast on as a single piece and integrally, but alternatively may also be adhesively attached or riveted on.

Furthermore, the structural element may be provided with ribs which run approximately parallel to the rib at the flange and extend from the ends of one side face to the ends of the parallel other side face at a distance from the outer feet of the arches of the outer transverse members and approximately perpendicular to the flange, and stiffening triangles running from the feet of the arches to the ribs may be provided.

If the outer skin is cast on as a single piece and integrally, the flange may form an edge region of the outer skin.

In the case of the structural element according to the invention, accumulations of material and rough cross-sectional transitions can be avoided, with unavoidable cross-sectional widenings preferably being arranged in the direction of feeding.

The arched-bridge-like formation of the hollow transverse members allows adequately large openings for core removal to be provided; undercut core geometries are not required. The structural element has no deep, thin slits, from which the core material is difficult to remove, and is provided with adequately large corner radii, facilitating shaking out.

The structural element may preferably be provided with a smooth outer skin, inwardly protruding, parallel longitudinal ribs, hollow elevated transverse members, reaching over the longitudinal ribs in an arched-bridge-like manner, side faces of the same height connecting and closing the end faces of the transverse members, a peripheral flange, forming part of the outer face and stiffened by a peripheral, inwardly projecting rib, and receptacles with gripping surfaces for straightening, adjustment and machining.

With the structural element according to the invention, simple mold parting lines with few cores, adequate drafts, adequate core cross sections for core production and handling and also appropriate core mountings can be achieved.

If the edges of the holes of the arched-bridge-like transverse members are stabilized with beads, a slight distortion of the structural element occurs during a heat treatment following the casting operation. For a heat treatment which can be carried out without any problems, rib structures with low internal stresses are used, rough cross-sectional transitions are avoided and notch stresses are reduced by means of adequately large corner radii. The distortion of the structural element remains low if air quenching is used during the heat treatment.

For cleaning the cast structural elements, all the mold and core parting lines are easily accessible, no crossing cores are used, cleaning ribs are provided in the region of the parting joints to avoid the surface of the workpiece being removed during cleaning, and as many cleaning regions as possible are arranged where machining is subsequently carried out.

Machining is performed in particular on the outer face of the outer skin and/or the inwardly directed surfaces of the transverse members and/or the outer faces of the side faces connecting the end faces of the transverse members and/or the inner face of the peripheral flange and/or the stiffening rib at the flange, on both sides, and/or the gripping surfaces of the receptacles.

If the machining allowances for the outer skin are approximately 6 mm for a machined wall thickness of approximately 1.5 to 2.7 mm and, for the remaining faces to be machined, approximately 3 mm for a machined wall thickness of approximately 3 to 4.2 mm, and the wall thickness of the cast, unmachined regions is 3 to 4.2 mm, a structural element can be produced in a single-piece, integral cast embodiment of a weight which is less than that of a conventionally produced structural element and the production and machining effort for which is likewise greatly reduced.

The receptacles with the gripping surfaces are preferably arranged on dimensionally stable regions, in particular at the four corners of a rectangle formed by the outer transverse members and the side faces connecting them.

Figure 2:
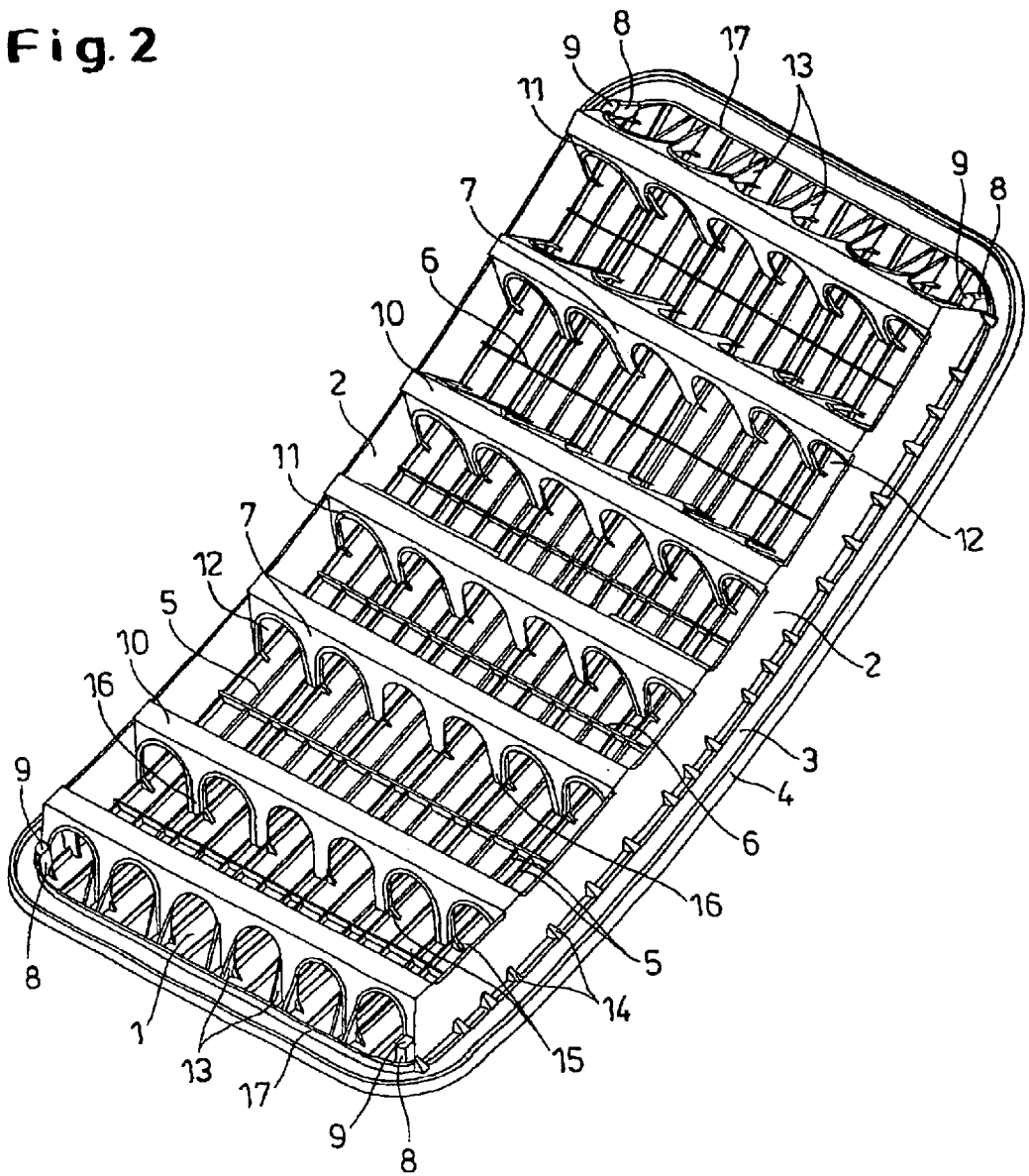
Figure 3:
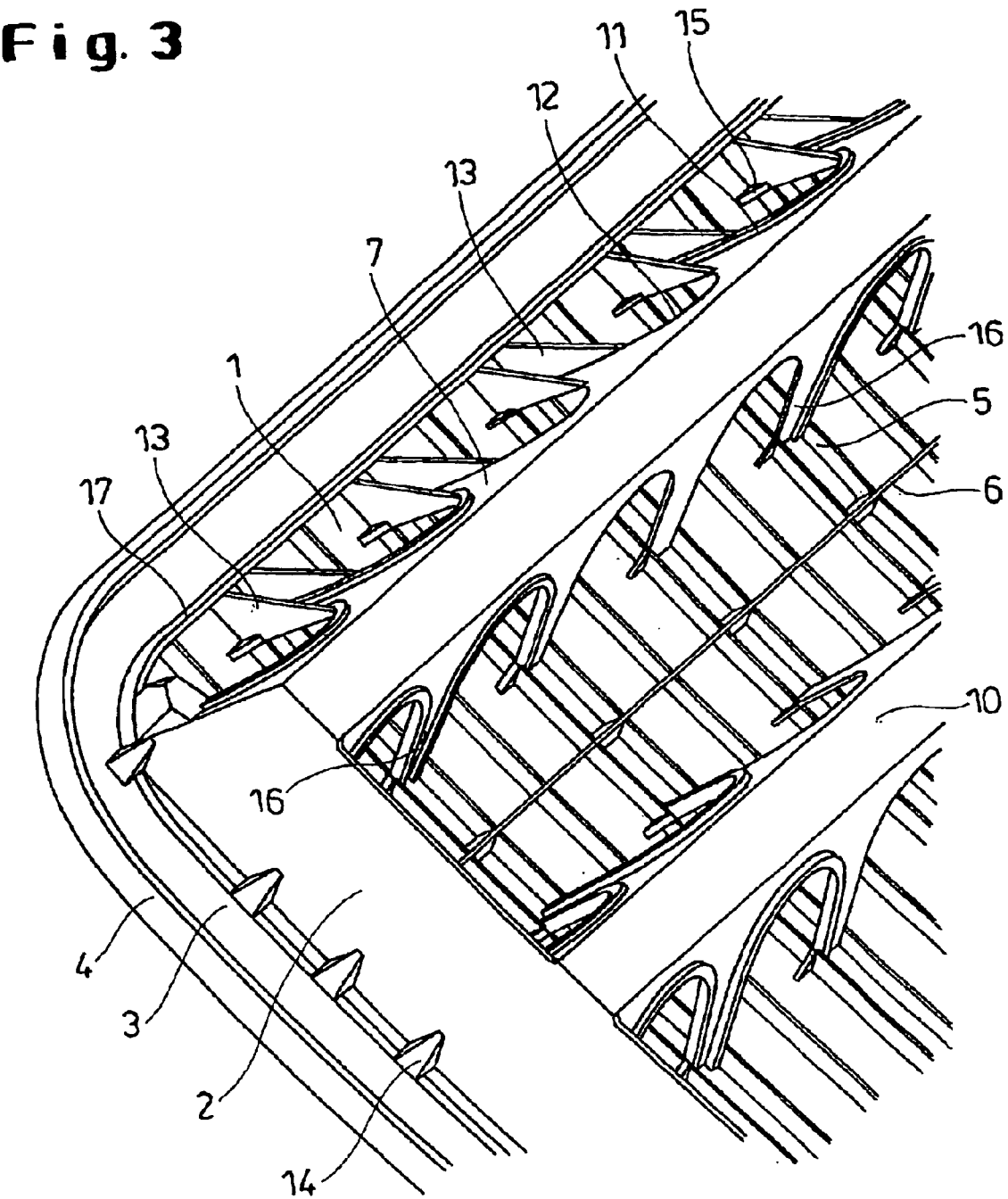

The invention is explained in more detail below on the basis of an exemplary embodiment represented in the drawing, in which:

FIG. 1 shows a perspective view of the outer face of an aircraft door according to the invention as a wire model, FIG. 2 shows a perspective view of the unclad inner side of an aircraft door according to the invention as a wire model and FIG. 3 shows an enlarged view of a corner region of the inner side of the aircraft door according to the invention as a wire model.

The structural element according to the invention is, in the case of the exemplary embodiment represented, an aircraft door in a single-piece, integral cast embodiment consisting of an aluminum or magnesium alloy and has a height of about 2400 mm and a width of about 1300 mm.

The aircraft door is curved in a customary way with a radius which corresponds to the curvature of the part of the fuselage where the door is fitted.

An outer skin 1, which has a completely smooth surface on the outside, is connected to a load-bearing stiffening structure, which comprises longitudinal ribs 5, transverse ribs 6, elevated transverse members 7 reaching over the longitudinal ribs 5 in an arched-bridge-like manner, and side faces 2 connecting and closing the end faces of the transverse members 7. A peripheral flange 3 forms part of the outer skin 1 and is stiffened by a peripheral, inwardly projecting rib 4.

Provided on the narrow sides are ribs 17, which run approximately parallel to the rib 4 at the flange 3 and extend from the ends of one side face 2 to the ends of the parallel other side face 2 at a distance from the outer feet 16 of the arches of the outer transverse members 7 and approximately perpendicular to the flange 3.

In each case, one longitudinal rib 5 runs approximately centrally under the arch openings 12, while two further, parallel longitudinal ribs 5 have a spacing corresponding to the width of the feet 16 of the arches and are connected to the latter. Arranged at the four corners in the region of the ends of the upper and lower transverse members 7 and the side faces 2 are receptacles 8 with gripping surfaces 9 for holding during heat treatment, straightening and machining. From the feet of the arches of the outer transverse members 7, stiffening triangles 13 extend to the ribs 17. Further stiffening triangles 14 are arranged along the side faces 2. Finally, stiffening triangles 15 are also provided in the region of the feet 16 of the arches and the ribs 5 running there. Between the transverse members 7, the side faces 2 may be additionally supported inwardly by means of reinforcing triangles, not represented, in order to avoid denting of the side faces 2 under flexural stress.

The edges of the arch openings 12 are stabilized by means of beads 11.

A rib structure which has low internal stresses and no rough cross-sectional transitions is achieved by largest possible transitional radii between the individual elements. Adequately large corner radii result in only small notch stresses during the heat treatment after casting and in operation. The aircraft door with the structure according to the invention has particularly low distortion after the heat treatment, in particular when the aircraft door is quenched with air after the heat treatment.

The structural element according to the invention produces simple mold parting lines, requires few cores and can be provided with adequate drafts. The cross sections of the cores are adequately large, so that they are easy to produce and handle.

The structural element can be produced preferably by the low-pressure sand casting process. The material properties are improved by the use of zircon sand and/or a semipermanent mold.

With the structural element according to the invention, accumulations of material and rough cross-sectional transitions can be avoided; unavoidable cross-sectional widenings can be arranged in the direction of feeding. The wall thicknesses can be made from a technical casting viewpoint in such a way that the wall thickness of the cast, unmachined regions is 3 to 4.2 mm, the wall thickness of the outer skin in the cast state is approximately 7.5 to 8.7 mm and that of the remaining faces to be machined approximately 6 to 7.2 mm.

After the machining, the wall thickness of the outer skin I is approximately 1.5 to 2.7 mm, i.e. the machining allowance is approximately 6 mm, while the wall thickness of the remaining faces to be machined, i.e. of the flange 3, the rib 4, the surfaces of the transverse members 10 before the machining are approximately 6 to 7.2 mm and after the machining are approximately 3 to 4.2 mm. Said machining surfaces are offset from the surfaces not to be machined of the unfinished part, and corner radii that are as large as possible are provided everywhere.

To facilitate shaking out from the casting mold, adequately large arch openings 12 are provided in the transverse members 7, so that the hollow regions under the transverse members 7 allow easy core removal. There are no undercut core geometries nor any deep, thin slits from which the molding sand is difficult to remove.

All mold and core parting lines are easily accessible and provided with cleaning ribs, so that the risk of removing the surface of the material during cleaning is reduced.

Sprues, runners and feeders can be arranged in regions which are machined, so that the effort involved in cleaning is low and robots can be used for the cleaning.

The receiving points for straightening and machining, i.e. the receptacles 8 with the gripping surfaces 9, are arranged on dimensionally stable regions of the structural element and are adequately dimensioned.

The structural element according to the invention has very good static and dynamic strength properties along with a simple geometry, without requiring complex core technology. The wall thicknesses can be optimized with regard to the stressing zones.

The exemplary embodiment represented shows an aircraft door cast as a single piece and integrally, including the outer skin 1, but it is also possible to produce a structural element as a cast part comprising the side faces 2, possibly the flange 3 with the rib 4, the longitudinal ribs 5, the transverse ribs 6, the transverse members 7, the receptacles 8 and the ribs 17, to machine surfaces of it, where required, and subsequently to connect it to an outer skin 1 made of rolled sheet metal by riveting or adhesive bonding.

What is claimed:

1. A structural element for an aircraft, in a single-piece, integral cast embodiment consisting of an aluminum or magnesium alloy hollow, arched-bridge-like transverse members (7), which have adequately large arch opening (12) for core removal and no undercut core geometries; the structural element comprising:

longitudinal ribs (5) connecting the feet (16) of the arches of the transverse members (7);

sloping side faces (2) connecting and closing the end faces of the transverse members (7); and receptacles (8) with machined gripping surfaces (9) for holding during heat treatment, straightening and machining.

2. The structural element as claimed in claim 1, with air quenching during the heat treatment to reduce internal stresses in the component.

3. The structural element as claimed in claim 1, with a peripheral flange (3), stiffened by an approximately perpendicular rib (4).

4. The structural element as claimed in claim 3, with ribs (17) which run approximately parallel to the rib (4) at the flange (3) and extend from the ends of one side face (2) to the ends of the parallel other side face (2) at a distance from the outer feet (16) of the arches of the outer transverse members (7) and approximately perpendicular to the flange (3).

5. The structural element as claimed in claim 4, with stiffening triangles (13) running from the feet (16) of the arches to the ribs (17).

6. The structural element as claimed in claim 1, with a smooth outer skin (1) cast on as a single piece.

7. The structural element as claimed in claim 6, in which the flange (3) forms an edge region of the outer skin (1).

8. The structural element as claimed in claim 1, comprising a smooth outer skin (1), inwardly protruding, parallel longitudinal ribs (5), hollow elevated transverse members (7), reaching over the longitudinal ribs (5) in an arched-bridge-like manner, side faces (2) of the same height connecting and closing the end faces of the transverse members (7), a peripheral flange (3), forming part of the outer skin (1) and stiffened by a peripheral, inwardly projecting rib (4), and receptacles (8) with machined gripping surfaces (9) for straightening and machining.

9. The structural element as claimed in claim 1, in which the edges of the holes of the arched-bridge-like transverse members (7) are stabilized with beads (11).

10. The structural element as claimed in claim 1, in which the outer face of the outer skin (1) and/or the inwardly directed surfaces (10) of the transverse members (7) and/or the outer faces of the side faces (2) connecting the end faces of the transverse members (7) and/or the peripheral flange (3) on its inner face and/or the stiffening rib (4) at the flange, on both sides, are machined.

11. The structural element as claimed in claim 10, in which the machining allowances for the outer skin (1) are approximately 6 mm for a machined wall thickness of approximately 1.5 to 2.7 mm and, the machining allowances for the remaining faces to be machined, are approximately 3 mm for a machined wall thickness of approximately 3 to 4.2 mm.

12. The structural element as claimed in claim 1, in which the wall thickness of the cast, unmachined regions is 3 to 4.2 mm.

13. The structural element as claimed in claim 1, in which the receptacles (8) with the gripping surfaces (9) are arranged on dimensionally stable regions.

14. The structural element as claimed in claim 13, in which the receptacles with the gripping surfaces 99) are arranged in the four corners of a rectangle formed by the outer transverse members (7) and the side faces 92) connecting them.

15. The structural element as claimed in claim 1, with rib structures which have low internal stresses.

16. The structural element as claimed in claim 1, with smooth, rounded-off cross-sectional transitions.

17. The structural element as claimed in claim 1, with large flanging radii that reduce notch stresses.

* * * * *